(12) United States Patent
Feng

(10) Patent No.: US 8,331,537 B2
(45) Date of Patent: Dec. 11, 2012

(54) METHOD AND SYSTEM FOR MANAGING LINE TOPOLOGY

(75) Inventor: Ruzhou Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 12/939,624

(22) Filed: Nov. 4, 2010

(65) Prior Publication Data

US 2011/0058502 A1 Mar. 10, 2011

Related U.S. Application Data

(63) Continuation of application No. PCT/CN2009/071609, filed on Apr. 30, 2009.

(30) Foreign Application Priority Data

May 4, 2008 (CN) .......................... 2008 1 0066937

(51) Int. Cl.
*H04M 1/24* (2006.01)
*H04M 3/08* (2006.01)
*H04M 3/22* (2006.01)
(52) U.S. Cl. .... 379/1.04; 379/22.08; 379/24; 379/27.01
(58) Field of Classification Search .................. 379/1.01, 379/1.03, 1.04, 22, 22.04, 22.07, 23, 24, 379/27.01, 29.01, 29.05, 32.04, 22.08
See application file for complete search history.

(56) References Cited

U.S. PATENT DOCUMENTS 6,829,330 B2 * 12/2004 Belge et al. ................ 379/22.04
(Continued)

FOREIGN PATENT DOCUMENTS

CN 101133632 A 2/2008
(Continued)

OTHER PUBLICATIONS

International Search Report issued in corresponding PCT Application No. PCT/CN2009/071609 dated Aug. 6, 2009.

(Continued)

*Primary Examiner* — Binh Tieu
(74) *Attorney, Agent, or Firm* — Brinks Hofer Gilson & Lione

(57) ABSTRACT

A method and system for managing a line topology is provided by the embodiments of the disclosure. The method for managing a line topology includes obtaining an actual transfer function of the line according to the actual transfer function of the line and a transfer function of the bridge tap model, estimating a diameter and length of the bridge tap of the line and a diameter and length of the trunk line of the line according to the estimated diameter and length of the bridge tap and the diameter and length of the trunk line, obtaining a transfer function of the line model that includes the location parameter of the bridge tap by comparing the error between the actual transfer function and the transfer function of the line model which includes the location parameter of the bridge tap, estimating the position of the bridge tap according to the estimated diameter and length of the trunk line and the diameter and length of the bridge tap and the location of the bridge tap, and generating a topology of the line. By applying the embodiment of the disclosure to maintain and manage the line topology, the location of the bridge tap can be estimated effectively, and the line topology can be obtained.

14 Claims, 9 Drawing Sheets

U.S. PATENT DOCUMENTS

| | | | |
|---|---|---|---|
| 6,865,221 B2 | 3/2005 | Belge | |
| 7,216,268 B2 | 5/2007 | Ryckebusch et al. | |
| 7,623,630 B2 * | 11/2009 | Ferdosi et al. | 379/27.01 |
| 2001/0043647 A1 * | 11/2001 | Belge | 375/222 |
| 2002/0067802 A1 | 6/2002 | Smith et al. | |
| 2002/0181665 A1 * | 12/2002 | Belge et al. | 379/27.01 |
| 2003/0026391 A1 * | 2/2003 | Kamali et al. | 379/27.01 |
| 2004/0062361 A1 * | 4/2004 | Kamali et al. | 379/1.04 |
| 2005/0036560 A1 * | 2/2005 | Lu et al. | 375/257 |
| 2005/0122916 A1 | 6/2005 | Rubin et al. | |
| 2005/0123030 A1 * | 6/2005 | Belge | 375/222 |
| 2006/0115056 A1 | 6/2006 | Kramer | |
| 2006/0227940 A1 * | 10/2006 | Ferdosi et al. | 379/22.04 |
| 2010/0142602 A1 * | 6/2010 | Belge | 375/222 |
| 2011/0026569 A1 * | 2/2011 | Belge | 375/222 |

FOREIGN PATENT DOCUMENTS

WO    WO 2007/089173 A1    8/2007

OTHER PUBLICATIONS

Written Opinion of the International Searching Authority issued in corresponding PCT Patent Application No. PCT/CN2009/071609, mailed Aug. 6, 2009.

* cited by examiner

METHOD AND SYSTEM FOR MANAGING LINE TOPOLOGY

CROSS-REFERENCE TO RELATED APPLICATIONS

This application is a continuation of International Application No. PCT/CN2009/071609, filed on Apr. 30, 2009, which claims priority to Chinese patent application No. 200810066937.3, filed on May 4, 2008, both of which are hereby incorporated by reference in their entireties.

FIELD OF THE DISCLOSURE

The present disclosure relates to the technical field of network communications, and particularly, to a method and system for managing a line topology.

BACKGROUND OF THE DISCLOSURE

The Digital Subscriber Line (DSL) technique is a high-speed transmission technique that transmits data over a telephone twist pair, i.e., Unshielded Twist Pair (UTP), and may include the following techniques: an Asymmetrical Digital Subscriber Line (ADSL), a Very-high-bit-rate Digital Subscriber Line (VDSL), an Integrated Services Digital Network (ISDN)-based Digital Subscriber Line (IDSL), a Single-pair High-bit-rate Digital Subscriber Line (SHDSL), an Asymmetrical Digital Subscriber Line 2 (ADSL2), an Asymmetrical Digital Subscriber Line 2plus (ADSL2plus), a Very-high-bit-rate Digital Subscriber Line 2 (VDSL2), etc.

With the gradual expansion of the scale of a network of Digital Subscriber Line Access Multiplexers (DSLAM), applications of the DSLAM network face problems with regards to quick subscriber cable selection, accurate fault location, and automatic periodic line maintenance. At the initial stage for deploying the DSLAM network, services fulfillment in small-scale network may be maintained manually. However, with the gradual expansion of the scale of the DSLAM network, testing and maintaining the twist pair merely on a manual basis does not meet the developing demand of the DSLAM network. Thus the problem regarding the test and maintenance of twist pairs has become a bottleneck of the large-scale development of the DSLAM network.

SUMMARY OF THE DISCLOSURE

Embodiments of the present disclosure provide a method and a system for managing a line topology and estimating a topological parameter.

An embodiment of the present disclosure provides a method for managing a line topology that includes obtaining an actual transfer function of a line by performing one or more line tests, estimating a line diameter and length of a bridge tap of the line and a line diameter and length of a trunk line of the line according to the actual transfer function of the line and a transfer function of a bridge tap model, obtaining a transfer function of a line model according to the estimated line diameters and lengths of the bridge tap and the trunk line, where the transfer function of the line model includes a positional parameter of the bridge tap and estimating a position of the bridge tap by comparing an error between the actual transfer function and the transfer function of the line model with the position parameter of the bridge tap, and generating a topology of the line according to the estimated line diameters and lengths of the trunk line and the bridge tap as well as the position of the bridge tap.

Another embodiment of the present disclosure provides a system for managing a line topology that includes an actual transfer function generating module configured to obtain an actual transfer function of a line according to results of one or more line tests, a line diameter and length estimating module configured to estimate line diameters and lengths of a bridge tap and a trunk line of the line according to the actual transfer function and a transfer function of a bridge tap model, a bridge tap position estimating module configured to obtain a transfer function of a line model with a position parameter of the bridge tap according to the estimated line diameters and lengths of the bridge tap and the trunk line and configured to estimate a position of the bridge tap by comparing an error between the actual transfer function and the transfer function of the line model with the position parameter of the bridge tap, and
a line topology generating module configured to generate a line topology according to the estimated line diameters and lengths of the trunk line and the bridge tap as well as the estimated position of the bridge tap.

When the embodiments of the present disclosure are used for the maintenance and management of the line topology, not only can the line diameters and the lengths of the bridge tap and the trunk line of the line be estimated, but also the position of the bridge tap can be estimated effectively so that the line topology can be obtained.

DETAILED DESCRIPTION OF THE DISCLOSURE

Embodiments of the present disclosure provide a method, an apparatus, and a system for managing a line topology line and topological parameters. During the process of line topology management, an actual transfer function of the line is obtained by performing line tests. Line diameters and lengths of a bridge tap and a trunk line are estimated according to the actual transfer function of the line and a transfer function of a bridge tap model. A transfer function of a line model with a position parameter of the bridge tap is obtained according to the estimated line diameters and lengths of the bridge tap and the trunk line. The position of the bridge tap is estimated by comparing an error between the actual transfer function and the transfer function of the line model with the position parameter of the bridge tap. Further, the topology of the line is generated according to the estimated line diameters and lengths of the bridge tap and the trunk line as well as the position of the bridge tap. With the embodiments of the present disclosure to manage and maintain the line topology, not only can the line diameters and lengths of the bridge tap and the trunk line be estimated, but also the position of the bridge tap can be estimated effectively so that the line topology can be obtained.

In order to make the objects, technical solutions and advantages of the embodiments of the present disclosure clearer, the present disclosure is further described in details by way of examples and with reference to the drawings.

Figure 1:
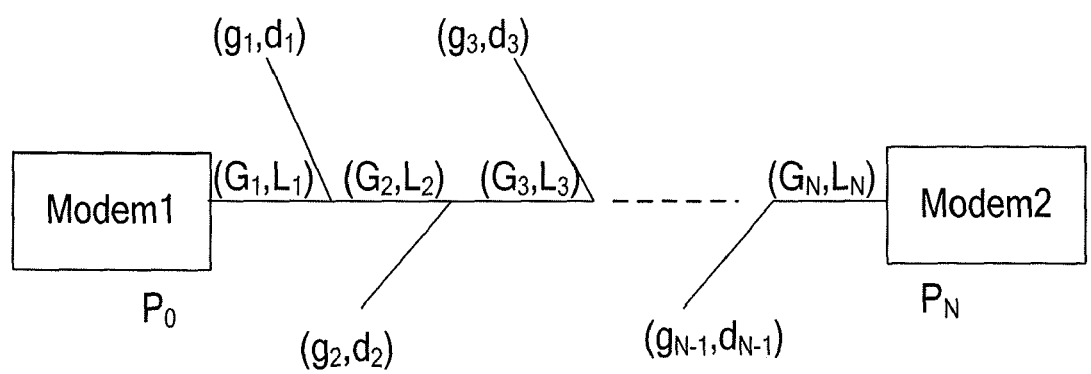
FIG. 1 is a schematic diagram of an existing line topology.

According to an embodiment of the present disclosure, a method and a system for managing a line topology are provided. The method estimates line parameters of a DSL including a line diameter and length of a bridge tap, a line diameter and length of a trunk line, and a position of the bridge tap. FIG. 1 is a schematic diagram of a DSL topology in which a DSL is connected between two modems Modem1 and Modem2, and the DSL has (N−1)th bridge taps that divide the trunk line into N segments. Parameters of each of the segments of the trunk line are represented with the line diameter and length, i.e., (Gi, Li) as shown in FIG. 1, where $1 \leq i \leq N$, Gi indicates the line diameter of the ith segment, and Li indicates the length of the ith segment. The line diameter of each segment of the trunk line may be approximately equal to each other. Parameters of each bridge tap are represented with the line diameter and length, i.e., (gi, di) as shown in FIG. 1, where $1 < i < N-1$, gi indicates the line diameter of the ith bridge tap, and di is indicative the length of the ith bridge tap. An example process of estimating a line topology is described as follows with reference to FIG. 2.

Figure 2:
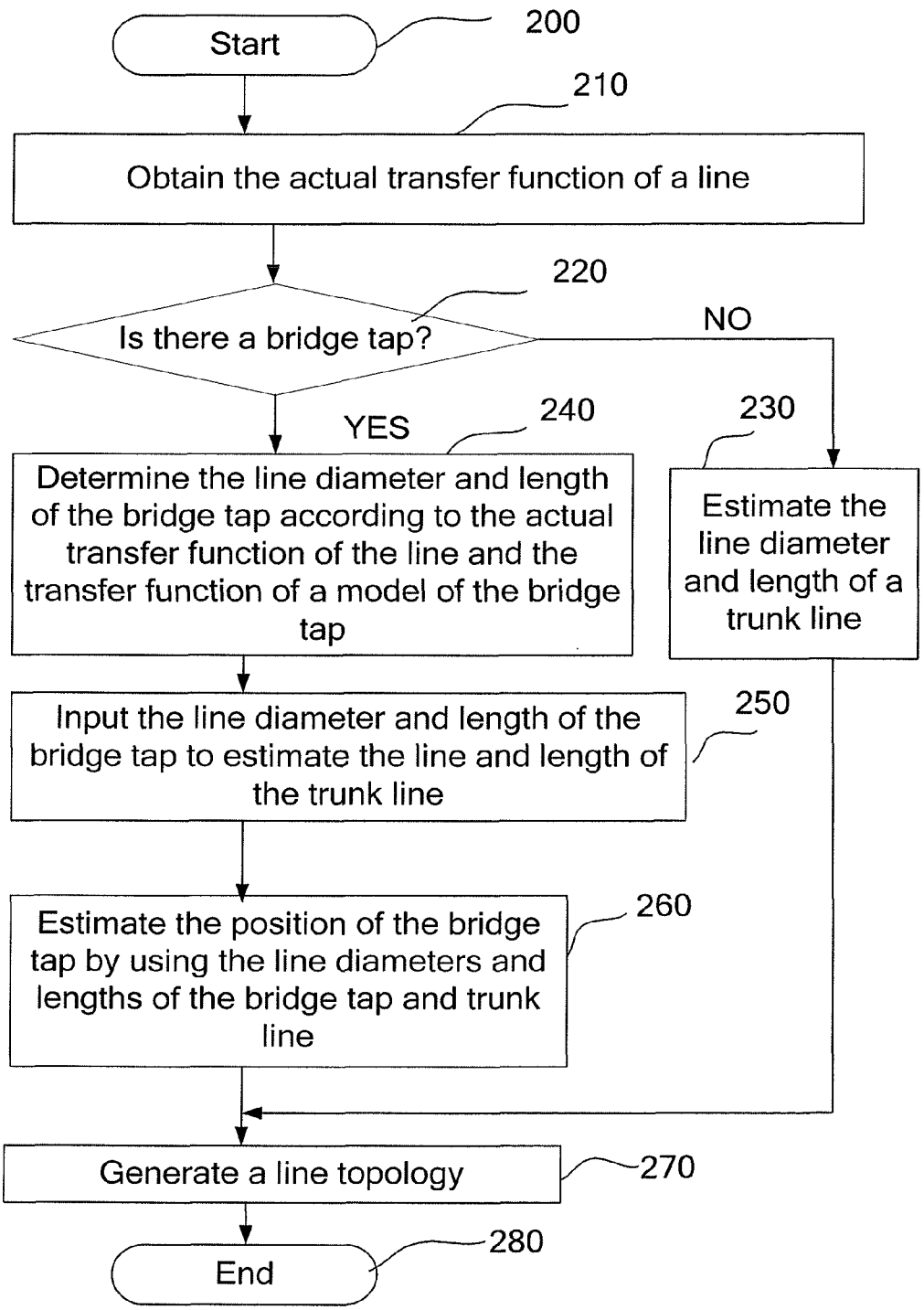
FIG. 2 is a flowchart illustrating a method for estimating a line topology according to an embodiment of the present disclosure.

FIG. 2 is a flowchart illustrating a method for estimating a line topology, from step 200 to step 280.

In step 210, a system obtains an actual transfer function of a line.

In step 220, it is determined whether there is a bridge tap according to the obtained actual transfer function of the line. If it is determined that there is no bridge tap, the process goes to step 230, and if it is determined that there is a bridge tap, the process goes to step 240.

In step 230, a line diameter and length of a trunk line which is the line per se at that time are estimated, and then the process goes to step 270.

In step 240, a line diameter and length of the bridge tap are determined according to the actual transfer function of the line and a transfer function of a bridge tap model.

In step 250, a line diameter and length of the bridge tap are input to estimate a line diameter and length of the trunk line.

In step 260, a position of the bridge tap is estimated according to the line diameters and lengths of the bridge tap and the trunk line.

In step 270, a topology of the line is generated according to the line parameters obtained in the above steps. Herein, in case that the line has a bridge tap, the line topology is obtained according to the line diameters and lengths of the trunk line and the bridge tap as well as the position of the bridge tap, while in case that the line has no bridge tap, the line topology can be generated directly according to the line diameter and length of the trunk line obtained in step 230.

In step 280, the process ends.

Optionally, in order to improve the precision and accuracy of subsequent processing, a noise canceling process may be carried out on the actual transfer function obtained through the line tests in various ways, including, for example: 1) operating at both ends of the line to carry out a plurality of tests, and performing an averaging process the actual transfer functions of the line obtained in all the tests; 2) performing a median filtering process on the actual transfer function of the line within a filtering window; and 3) performing a mean filtering process on the actual transfer function of the line within a filtering window.

According to an embodiment of the present disclosure, the actual transfer function of the line can be obtained as follows:

Test apparatuses are provided at both ends of the line, respectively, one for transmission and the other for reception, and thus a line test is performed by communicating information between the two ends. For example, a test signal is transmitted from the test apparatus at the transmitting end to the receiving end. The test signal may comprise a known power spectral density and a known frequency range. Upon receiving the test signal, the test apparatus at the receiving end measures the received test signal and calculates the actual transfer function of the line according to the known parameters of the test signal such as the frequency range and power spectral density of the test signal and the measured parameters of the test signal and line attenuation. Static noise power spectrum, a signal to noise ratio, a noise margin, and a reachable maximum rate, etc. may further be calculated. Herein, as the known parameters of the test signal, the setting parameters of a test signal generator for generating a test signal may be reported to the receiving end by the test apparatus at the transmitting end during the process of each test instance or the parameters of the test signal generated through real-time test at the transmitting end may be reported to the receiving end so that the test signal can be dynamically adjusted. The parameters provided in the later way are more accurate than those provided in the former way. The known parameters of the test signal may also be parameters negotiated and stored by the transmitting end and the receiving end, respectively. In this case, the transmitting end may generate a test signal according to the negotiated parameters, and the receiving end only needs to measure the received test signal and read the locally stored parameters and measured parameters to carry out processing on the received test signal and complete the test. For example, a standard Double End Line Test (DELT) method may be adopted for the test to obtain the actual transfer function of the line. According to an embodiment of the present disclosure, a special test tool such as a third party test head may also be used for obtaining the actual transfer function of the line. Because the DELT method does not utilize the reflection principle, the DELT method's test distance and measurement accuracy are superior to the Single End Line test.

In an actual application, an example of the DELT method is further described as follows.

The actual transfer function of the line is obtained through the DELT method.

For example, with reference to a line enabling an ADSL2/2+ service, the actual transfer function of the line and related parameter information can be obtained by performing a DELT between Modem1 of a Central Office (CO) and Modem2 of a Customer Premise Equipment (CPE). The transfer function of the line is also known as the channel transfer function of a sub-carrier in a discrete multi-tone modulation DSL communication system.

Provisions related to the DELT are specified in the ADSL2/2+ standard of the ITU-T, and herein are not described in details. After the DELT is completed, the CO and the CPE interchange messages to obtain the following parameter information: LATN: Line Attenuation (LATN), SATN: Signal Attenuation (SATN), SNRM: Signal to Noise Ratio Margin (SNRM), ATTNDR: Attainable Net Data Rate (ATTNDR), ACTATP: Actual Aggregate Transmit Power (ACTATP),

|Hlin(f)|: Complex value under linear nominal of the channel transfer function of a sub-carrier,

|H log(f)|: magnitude under logarithmic nominal of the channel transfer function of a sub-carrier, QLN(f): Static line noise of each sub-carrier, PSD QLN (f), and SNR(f): Signal to Noise Ratio of each sub-carrier, SNR (f), wherein |Hlin(f)| is a channel transfer function, and |H log(f)| is the logarithmic form of the amplitude of the channel transfer function.

2. With reference to a line of another type of DSL service, a channel transfer function may be obtained by using a special test tool (e.g., a third party test head).

After the actual transfer function |Hlin(f)| of the line is obtained through a test, noise may exist therein. In order to improve the accuracy, a noise canceling process may be carried out to remove the influence of the noise. The above three noise canceling processes are further described as follows by taking the DELT as an example.

1) Performing a plurality of tests and averaging the actual transfer functions of the line obtained in the plurality of tests to reduce noise. Herein, the method for averaging |Hlin(f)| is as follows.

After N times of DELT, an averaged channel transfer function |Hlin(f)| can be obtained as:

$$Hlin(f) = \frac{1}{N}\sum_{i=1}^{N} Hlin_i(f) \tag{1}$$

wherein |Hlin$_i$(f)| is the channel transfer function obtained in the ith DELT, and |Hlin(f)| is the channel transfer function obtained after the averaging process.

2) Performing a median filtering of the actual transfer function of the line to reduce noise within a filtering window. The median filtering of the channel transfer function |Hlin(f)| can be performed as follows.

Assuming that the size of the filtering window is W, which is typically an odd number, then |Hlin(f$_i$)| of the ith sub-carrier is equal to the median of a group of |Hlin(f)| data centering at |Hlin(f$_i$)| and having a window size of W.

The median filtering is effective in filtering impulse noise.

3) Performing a mean filtering of the actual transfer function of the line to reduce noise within a filtering window. The mean filtering of the channel transfer function |Hlin(f)| can be performed as follows.

Assuming that the size of the filtering window is W, then |Hlin(f$_i$)| of the ith sub-carrier is:

$$|Hlin(f_i)| = \begin{cases} \left| \frac{1}{W}\sum_{j=i-\frac{w}{2}}^{i+\frac{w}{2}} \left| Hlin(f_j) \right| \right|, \text{ where } W \text{ is an even number} \\ \left| \frac{1}{W}\sum_{j=i-\frac{w-1}{2}}^{i+\frac{w-1}{2}} \left| Hlin(f_j) \right| \right|, \text{ where } W \text{ is an odd number} \end{cases} \tag{2}$$

The mean filtering is effective in filtering Gaussian white noise.

The noise of |Hlin(f)| can be filtered so far as possible with any combination of two or more of the above three methods. Specially, a combination of all of the three methods can filter the noises of |Hlin(f)| as much as possible and make the data more accurate.

According to an embodiment of the present disclosure, the transfer function of the line can be obtained by means of a dual-port network model. A uniform twist pair can be deemed as one type of transmission line. With reference to any transmission line, it can be analyzed by means of a Resistance-Inductance-Capacitance-Conductance (RLCG) model. The so called RLCG model uses the RLCG parameters of the twist pair to represent the channel characteristics of the twist pair. This model is also called as a first-order model of the twist pair channel, because the RLCG model only provides the RLCG parameters of the twist pair channel without giving the transfer function of the twist pair channel. With the embodiment of the present disclosure, the transfer function is obtained by means of the RLCG parameters.

The numerical RLCG models of the twist pairs of #24 and #26 specification are obtained through curve-fitting of the measured cable, and the effective frequency thereof ranges from DC to 10 MHz. Equations (1)-(4) are the general equations of the RLCG model.

$$R(f) = \sqrt[4]{r_{oc}^4 + a_c f^2} \tag{3}$$

$$L(f) = \frac{l_0 + l_\infty (f/f_m)^b}{1 + (f/f_m)^b} \tag{4}$$

$$G(f) = g_0 f^{g_e} \tag{5}$$

$$C(f) = c_\infty \tag{6}$$

The parameters concerned in the equations are listed in Table 1.

TABLE 1

Parameters of the Numerical Twist Pair Model

| Parameter | #24 | #26 |
|---|---|---|
| $r_{oc}$/(Ω/km) | 174.55888 | 286.17578 |
| $a_c$/(Ω$^4$/km$^4$Hz$^2$) | 0.053073481 | 0.14769620 |
| $l_0$/(H/km) | 617.29593 * 10$^{-6}$ | 675.36888 * 10$^{-6}$ |
| $l_\infty$/(H/km) | 478.97099 * 10$^{-6}$ | 488.95186 * 10$^{-6}$ |
| $f_m$/(Hz) | 553760.63 | 806338.63 |
| b | 1.1529766 | 0.92930728 |
| $g_0$(Siemen/Hz * km) | 0.23487476 * 10$^{-12}$ | 4.3 * 10$^{-8}$ |
| $g_e$ | 1.38 | 0.70 |
| $c_\infty$(nF/km) | 50 * 10$^{-9}$ | 49 * 10$^{-9}$ |

According to the above RLCG parameters, two frequently-used parameters can be obtained: transmission constant γ and characteristic impedance $Z_0$.

The transmission constant is:

$$\gamma = \alpha + j\beta = \sqrt{(R+j\omega L)(G+j\omega C)} \qquad (7)$$

The characteristic impedance is:

$$Z_0 = \sqrt{\frac{R+j\omega L}{G+j\omega C}} \qquad (8)$$

The transmission constant is defined according to two basic assumptive conditions, one of which is that $j\omega C \gg G$, and the other of which is that $j\omega L \gg R$ when the frequency $f>100$ KHz. Equations 9 and 10 can be obtained from Equation 7:

$$\alpha = R\sqrt{\frac{C}{L}} = \alpha_0 f^{1/2} \qquad (9)$$

$$\beta = \omega\sqrt{LC} = \beta_0 f \qquad (10)$$

In the above two equations, $\alpha_0$ and $\beta_0$ are both constants.

Figure 6A:
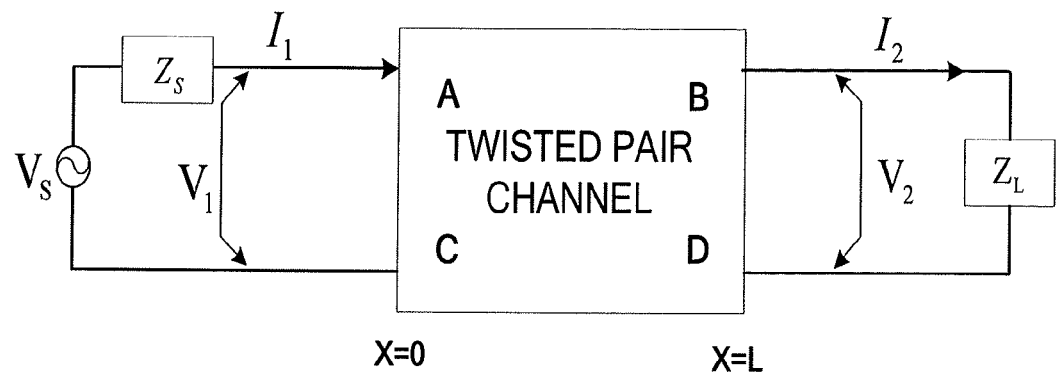
FIG. 6a is a schematic diagram illustrating a uniform twist pair transmission system.

FIG. 6a illustrates a uniform twist pair transmission system. Regarding the twist pair such as a DSL, ABCD parameters are usually used to represent the relationship between the voltage and current on the dual-port. The ABCD parameters are expressed as:

$$\begin{bmatrix} A & B \\ C & D \end{bmatrix} = \begin{bmatrix} \cosh(\lambda L) & Z_0 \sinh(\lambda L) \\ \frac{\sinh(\lambda L)}{Z_0} & \cosh(\lambda L) \end{bmatrix}$$

If there is no loop, i.e., $Z_s$ is connected directly to $Z_L$, then the voltage across the load is:

$$V_L = V_S \frac{Z_L}{Z_S + Z_L} \qquad (11)$$

If there is a loop, the voltage $V_1$ can be simplified into the following equation:

$$V_1 = AV_2 + BI_2 = V_S - I_1 Z_S \qquad (12)$$

Substituting the second basic ABCD equation for $I_1$ in the above equation will result in that:

$$V_1 = AV_2 + BI_2 = V_S - (CV_2 + DI_2) Z_S \qquad (13)$$

Substituting the Ohm's law $V_2/Z_L$ for $I_2$ will result in that:

$$AV_2 + B\frac{V_2}{Z_L} = V_S - \left(CV_2 + D\frac{V_2}{Z_L}\right) Z_S \qquad (14)$$

Then, $V_2$ can be solved through the above equation:

$$V_2 = \frac{V_S Z_L}{AZ_L + B + Z_S(CZ_L + D)} \qquad (15)$$

Then, the voltage transfer function Hlin is obtained as:

$$Hlin(f) = \frac{V_2}{V_L} = \frac{Z_S + Z_L}{AZ_L + B + CZ_S Z_L + DZ_S} \qquad (16)$$

Figure 6B:
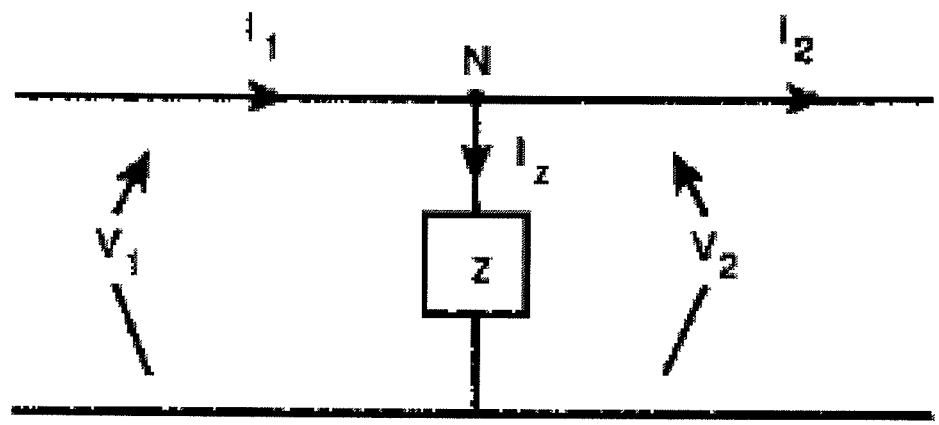
FIG. 6b is a schematic diagram of a dual-port network with lumped impedance connected in parallel.

When a bridge tap exists in the line, impedance mismatch will be caused to the trunk line and reflection will be generated which influences the transfer function of the whole line. The existence of the bridge tap in the trunk line may be treated as that a lumped impedance Z is connected in parallel to a dual-port network. FIG. 6b illustrates a dual-port network with lumped impedance connected in parallel. The ABCD parameters of the dual-port network connected in parallel with the impedance are obtained as follows by means of the Kirchhoff current law and the definition of ABCD parameters:

$$\begin{bmatrix} A & B \\ C & D \end{bmatrix} = \begin{bmatrix} 1 & 0 \\ \frac{1}{Z} & 1 \end{bmatrix} \qquad (17)$$

The influence on the ABCD parameters of the trunk line by the bridge tap can be shown as:

$$\begin{bmatrix} A & B \\ C & D \end{bmatrix}_{tap} = \begin{bmatrix} 1 & 0 \\ \frac{1}{Z_{in\,tap}} & 1 \end{bmatrix} \qquad (18)$$

wherein $Z_{in,tap}$ is an input impedance of the bridge tap, and if it is assumed that the length of the bridge tap is Ltap, then the input impedance of the bridge tap can be obtained through the following equation:

$$V_1 = \cosh(\gamma L_{tap})V_2 + Z_{0,tap}\sinh(\gamma L_{tap})I_2 \qquad (19)$$

$$I_1 = \frac{\sinh(\gamma L_{tap})}{Z_{0,tap}} V_2 + \cosh(\gamma L_{tap})I_2$$

The end of the bridge tap is open, and $I_2=0$, then:

$$Z_{in,tap} = \frac{V_1}{I_1} = \frac{\cosh(\gamma L_{tap})V_2}{\frac{\sinh(\gamma L_{tap})}{Z_{0,tap}}V_2} = Z_{0,tap}\coth(\gamma L_{tap}) \qquad (20)$$

Thus the ABCD parameters with the bridge tap is expressed as:

$$\begin{bmatrix} A & B \\ C & D \end{bmatrix}_{tap} = \begin{bmatrix} 1 & 0 \\ \frac{1}{Z_{in\,tap}} & 1 \end{bmatrix} = \begin{bmatrix} 1 & 0 \\ \frac{1}{Z_{0,tap}\coth(\gamma L_{tap})} & 1 \end{bmatrix} \qquad (21)$$

Figure 6C:
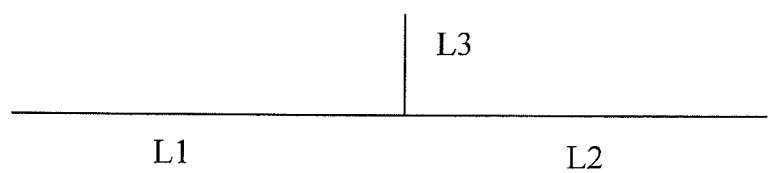
FIG. 6c is a schematic diagram of a bridge tap loop.

See the schematic diagram of a bridge tap loop as illustrated in FIG. 6c.

Assuming that the ABCD parameters of L1 and L2 are $$\begin{bmatrix} A_1 & B_2 \\ C_1 & D_1 \end{bmatrix}$$

and $$\begin{bmatrix} A_1 & B_2 \\ C_1 & D_1 \end{bmatrix}$$

respectively; when L3 is not existed, the ABCD parameters of the trunk loop is $$\begin{bmatrix} A & B \\ C & D \end{bmatrix}_{no,tap},$$

and when L3 exists, the ABCD parameters of the trunk loop is $$\begin{bmatrix} A & B \\ C & D \end{bmatrix}_{with,tap};$$

and further, L1+L2=L, then $$\begin{bmatrix} A & B \\ C & D \end{bmatrix}_{with,tap}$$

is as follows when the bridge tap exists:

$$\begin{bmatrix} A & B \\ C & D \end{bmatrix}_{with,tap} = \begin{bmatrix} A_1 & B_1 \\ C_1 & D_1 \end{bmatrix} \cdot \begin{bmatrix} 1 & 0 \\ \frac{1}{Z_{in,tap}} & 1 \end{bmatrix} \cdot \begin{bmatrix} A_2 & B_2 \\ C_2 & D_2 \end{bmatrix} \qquad (22)$$

$$= \begin{bmatrix} A_1 + \frac{B_1}{Z_{in,tap}} & B_1 \\ C_1 + \frac{B_1}{Z_{in,tap}} & D_1 \end{bmatrix} \cdot \begin{bmatrix} A_2 & B_2 \\ C_2 & D_2 \end{bmatrix}$$

$$= \begin{bmatrix} \left(A_1 + \frac{B_1}{Z_{in,tap}}\right)A_2 + B_1 C_2 & \left(A_1 + \frac{B_1}{Z_{in,tap}}\right)B_2 + B_1 D_2 \\ \left(C_1 + \frac{D_1}{Z_{in,tap}}\right)A_2 + D_1 C_2 & \left(C_1 + \frac{D_1}{Z_{in,tap}}\right)B_2 + D_1 D_2 \end{bmatrix}$$

$$= \begin{bmatrix} A + \frac{B_1 A_2}{Z_{in,tap}} & B + \frac{B_1 B_2}{Z_{in,tap}} \\ C + \frac{D_1 A_2}{Z_{in,tap}} & D + \frac{D_1 B_2}{Z_{in,tap}} \end{bmatrix}$$

$$= \begin{bmatrix} A & B \\ C & D \end{bmatrix}_{no,tap} + \frac{1}{Z_{in,tap}} \begin{bmatrix} B_1 A_2 & B_1 B_2 \\ D_1 A_2 & D_1 B_2 \end{bmatrix}$$

$$= \begin{bmatrix} \cosh(\gamma L) & Z_0 \sinh(\gamma L) \\ \frac{\sinh(\gamma L)}{Z_0} & \cosh(\gamma L) \end{bmatrix} +$$

$$\frac{1}{Z_{in,tap}} \begin{bmatrix} Z_0 \sinh(\gamma L_1)\cosh(\gamma L_2) & Z_0 \sinh(\gamma L_1) Z_0 \sinh(\gamma L_2) \\ \cosh(\gamma L_1)\cosh(\gamma L_2) & \cosh(\gamma L_1) Z_0 \sinh(\gamma L_2) \end{bmatrix}$$

$$= \begin{bmatrix} \cosh(\gamma L) + & Z_0 \sinh(\gamma L) + \\ \frac{Z_0}{Z_{in,tap}}\sinh(\gamma L_1)\cosh(\gamma L_2) & \frac{Z_0^2}{Z_{in,tap}}\sinh(\gamma L_1)\sinh(\gamma L_2) \\ \frac{\sinh(\gamma L)}{Z_0} + & \cosh(\gamma L) + \\ \frac{1}{Z_{in,tap}}\cosh(\gamma L_1)\cosh(\gamma L_2) & \frac{Z_0}{Z_{in,tap}}\cosh(\gamma L_1)\sinh(\gamma L_2) \end{bmatrix}$$

Substituting the above ABCD parameters into equation (18) and assuming that the source end impedance, the characteristic impedance and the load impedance are matched with each other, then it may be considered that $Z_G = Z_L \approx Z_0$ when $f \geqq 100$ kHz, thus:

$$H(f) = \frac{Z_G + Z_L}{AZ_L + B + Z_G(CZ_L + D)} \quad (23)$$

$$\approx \frac{2Z_0}{\left[\cosh(\gamma L) + \frac{Z_0}{Z_{in,tap}}\sinh(\gamma L_1)\cosh(\gamma L_2)\right]Z_0 + Z_0\sinh(\gamma L) + \frac{Z_0^2}{Z_{in,tap}}\sinh(\gamma L_1)\sin(\gamma L_2) + Z_0\left[\begin{array}{c}\sinh(\gamma L_1) + \frac{Z_0}{Z_{in,tap}}\cosh(\gamma L_1)\cosh(\gamma L_2) + \\ \cosh(\gamma L) + \frac{Z_0}{Z_{in,tap}}\cosh(\gamma L_1)\sinh(\gamma L_2)\end{array}\right]}$$

$$= \frac{2Z_0}{2Z_0[\sinh(\gamma L) + \cosh(\gamma L)] + \frac{Z_0^2}{Z_{in,tap}}[\sinh(\gamma L) + \cosh(\gamma L)]}$$

$$= \frac{2}{\left(\frac{Z_0}{Z_{in,tap}} + 2\right)[\sinh(\gamma L) + \cosh(\gamma L)]}$$

$$= \frac{2}{\left(\frac{Z_0}{Z_{in,tap}} + 2\right)e^{\gamma L}}$$

As can be seen from the above equation, H(f) is irrelevant to L1 and L2. Thus under the condition that the source end impedance, the characteristic impedance and the load impedance are matched with each other, when $f \geqq 100$ kHz, the position of the bridge tap has no influence on the transfer function H(f) of the loop where the bridge tap exists. Therefore, in the embodiment of the present disclosure, the transfer function of the line is approximately taken as a product of the transfer function of the trunk line with the transfer function of the bridge tap. Thus, the calculation can be greatly simplified by means of such relationship. In the context of the embodiments of the present disclosure, processing may be performed according to the above relationship.

In step 220, secondary derivation of the actual transfer function is performed and the second-order derivatives within the range of selected frequency points or spectrums are summed up. The result of the summation is compared with a threshold, and if the result is larger than or equal to the threshold, it is judged that a bridge tap exists in the line, and if the result is not larger than or unequal to the threshold, there is no bridge tap in the line.

Specifically, a method for estimating a bridge tap of the line according to the embodiment of the present disclosure includes the following steps of:
obtaining an actual transfer function of the line;
calculating the sum of the values of the second-order derivatives of the actual transfer function of the line at the selected frequency points;
comparing the calculated attenuation sum with a threshold A;
and determining the existence of a bridge tap of the line according to the result of the comparison.

The threshold for comparison can be determined according to a result of an ideal model and an actual test, can be set or adjusted in advance, or can be adjusted and updated upon demand in the course of processing. The selected frequency points may be discrete frequency points within a spectral range having a start frequency point f1 and an end frequency point f2.

Consider an example of a transfer function on which the noise cancellation has been performed. Assuming that the magnitude of the measured and noise canceling transfer function is $|H_{meas}(f)|_{dB}$, then a calculation is carried out according to the following equation:

$$\text{sum} = \sum_{f=f1}^{f2} \frac{\partial^2(|H_{meas}(f)|_{dB})}{\partial f^2} \quad (24)$$

In Equation (24), when sum>=A, a bridge tap exists in the line while when sum<A, there is no bridge tap in the line.

In Equation (24), f1 is a start frequency point of the frequency range upon which the calculation is performed, and f2 is an end frequency point of the frequency range. A is a threshold set for judgment, and A's magnitude can be determined according to the result of an ideal model and the actual test.

Figure 6D:
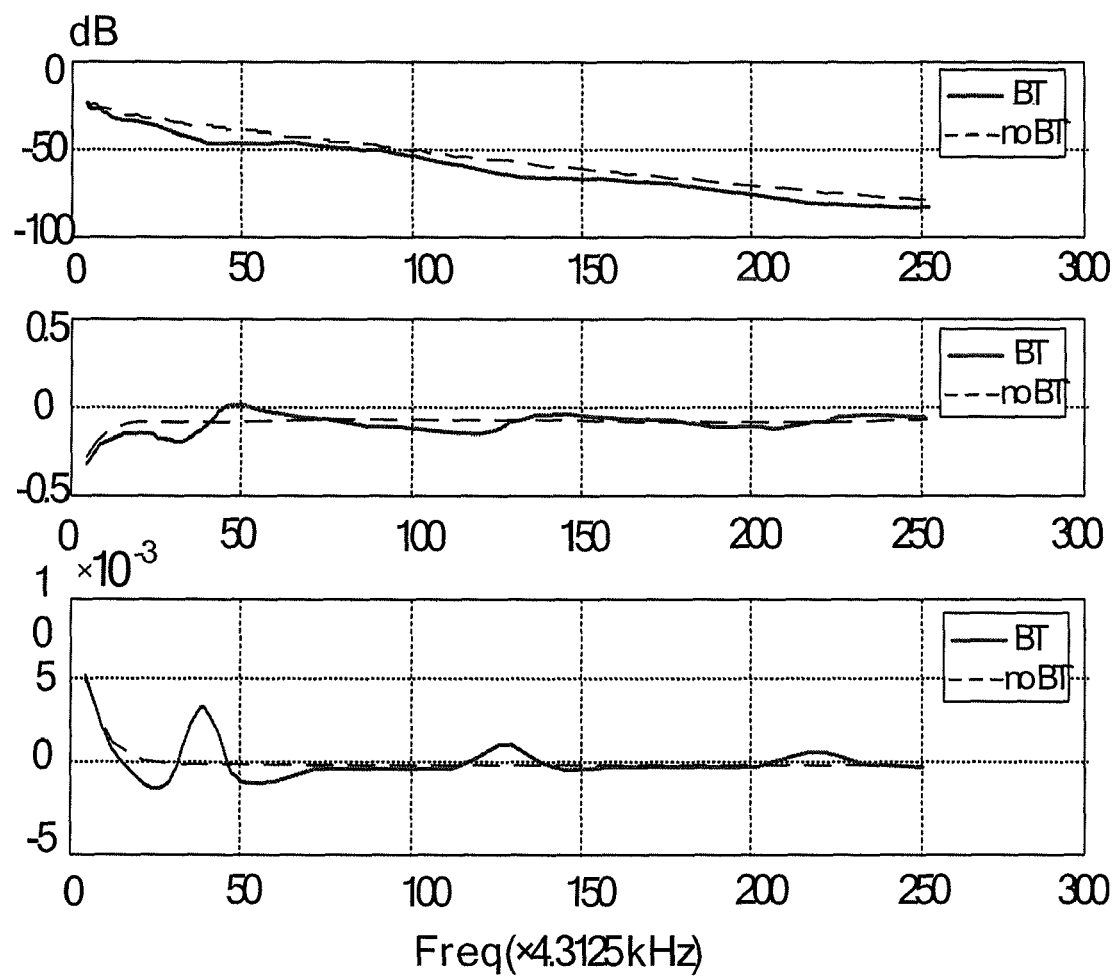
FIG. 6d is a graph illustrating influence by a bridge tap on a line transfer function according to an embodiment of the present disclosure.

FIG. 6d illustrates schematic graphs of first-order and second-order derivatives of $|H(f)|_{dB}$ according to an embodiment of the present disclosure. The influence on the transfer function by the bridge tap can be seen from FIG. 6d. A traveling wave and standing wave appear due to impedance mismatch caused by the existence of the bridge tap in the loop, and a null is caused in the actual transfer function $|H(f)|_{dB}$ of the line. As can be seen from FIG. 6d, the null produces inflection points in the function $|H(f)|_{dB}|$, which is originally nearly linear. Thus, the null can be detected by using the derivation method in order to determine whether a bridge tap exists.

Viewed from the top to bottom, FIG. 6d illustrates a transfer function $|H(f)|_{dB}$, a first-order derivative of the transfer function $|H(f)|_{dB}$ and a second-order derivative of the transfer function $|H(f)|_{dB}$. In FIG. 6d, the solid line is an attenuation curve of the transfer function of the line having a bridge tap, and the dotted line is an attenuation curve of the transfer function of the line having no bridge tap. Because $|H(f)|_{dB}$ without a bridge tap is nearly linear, the value of its second-order derivative is nearly 0. In case that a bridge tap exists, the secondary derivation function of $|H(f)|_{dB}$ as a non-zero point. Thus, a bridge tap can be detected by means of such relationship.

In step 230, with reference to the condition that the line has no bridge tap, the embodiment of the present disclosure provides two processing ways.

The first processing way includes: selecting a line diameter Gx of the trunk line, and estimating a length Lmeas of the trunk line according to the selected line diameter Gx of the trunk line; determining a transfer function of a trunk line model without a position parameter of a bridge tap according to the selected line diameter Gx of the trunk line and the estimated length Lmeas of the trunk line; and estimating the line diameter and the length of the trunk line by comparing the mean-square error between the transfer function $|H(Gx, L_{meas}, f_i)|_{dB}$ of the trunk line model without a position parameter of a bridge tap and the actual transfer function $|H_{meas}(f_i)|_{dB}$ of the line.

According to Equation (16), when the source end impedance, the characteristic impedance and the load impedance are matched with each other, it may be considered that $Z_G = Z_L \approx Z_0$ when $f \geqq 100$ kHz, and thus $$H(f) = \frac{Z_G + Z_L}{AZ_L + B + Z_G(CZ_L + D)} \quad (25)$$

$$= \frac{Z_G + Z_G}{AZ_G + B + Z_G(CZ_G + D)}$$

$$= \frac{Z_G + Z_G}{\cosh(\gamma L)Z_G + \sinh(\gamma L) + Z_G\left(\frac{\sinh(\gamma L)}{Z_0}Z_G + \cosh(\gamma L)\right)}$$

$$\approx \frac{1}{\cosh(\gamma L)Z_G + \sinh(\gamma L)}$$

$$= e^{-\gamma L} = e^{-(\alpha + j\beta)L}$$

Converting the amplitude of H(f) in the above equation into a dB value with result in that:

$$|H(f)|_{dB} = 20\log|e^{-\gamma L}| \quad (26)$$

$$= 20\log e^{-(\alpha + j\beta)L}$$

$$= 20\log e^{-\alpha L}$$

$$= (-20\alpha L)\log e \propto L$$

As can be seen from the above, when the frequency >100 KHz, $|H(f)|_{dB}$ and the line length L are nearly in a linear relationship under the same frequency, and thus the length Lmeas corresponding to the selected Gx can be calculated in the following equation such that:

$$L_{meas} = \frac{1}{N}\sum_{i=1}^{N} \frac{|H_{meas}(f_i)|_{dB}}{|H_{ref}(f_i)|_{dB}} \times L_{ref} \quad (27)$$

In Equation (27), is $H_{ref}(f_i)$ is an attenuation of a reference line under the line diameter Gx at the frequency point fi, $|H_{meas}(f)|_{dB}$ is an attenuation of the actual transfer function at the frequency point fi, $L_{ref}$ is the length of the reference line under the line diameter Gx, and N is the number of the selected frequency points.

According to the embodiment of the present disclosure, the transfer function of the trunk line model without a position parameter of a bridge tap can be determined according to the line diameter Gx and the length Lmeas of the trunk line, the mean-square error between the transfer function of the trunk line model without a position parameter of a bridge tap and the actual transfer function is compared to a certain threshold, and if the mean-square error is smaller than the certain threshold, it can be determined that the above Gx and Lmeas are estimated as the line diameter and length of the trunk line.

According to the embodiment of the present disclosure, preferably the line diameter Gx may be varied and corresponding Lmeas may be calculated in order to obtain a group of (Gx, Lmeas) by comparing mean-square errors between the transfer function of the trunk line model without a position parameter of a bridge tap and the actual transfer function corresponding to the group of (Gx, Lmeas), (Gx, Lmeas) corresponding to the minimum mean-square error is taken as the estimated line diameter and length of the trunk line.

The mean-square error function for determining the line diameter and the length of the trunk line is as follows:

$$\text{Error} = \sum_{i=1}^{N} (|H(Gx, L_{meas}, f_i)|_{dB} - |H_{meas}(f_i)|_{dB})^2 \quad (28)$$

In Equation (28), Gx is a possible loop line diameter, Lmeas is a loop length obtained under the line diameter Gx, $|H(Gx, L_{meas}, f_i)|_{dB}$ is an attenuation at a frequency point fi under the line diameter Gx and the length $L_{meas}$, $|H_{meas}(f_i)|_{dB}$ is an attenuation of the measured transfer function at the frequency point fi, and N is the number of the selected frequency points. In addition to the comparison of mean-square errors, absolute value errors, covariances, etc. can also be compared.

The second processing way includes: selecting a line diameter Gx and a length Lx of the trunk line; determining a transfer function $|H(Gx, Lx, f_i)|_{dB}$ of a trunk line model without a position parameter of a bridge tap according to the selected line diameter Gx and length Lx of the trunk line; estimating the line diameter and the length of the trunk line by comparing the transfer function $|H(Gx, Lx, f_i)|_{dB}$ of the trunk line model without a position parameter of a bridge tap and the actual transfer function $|H_{meas}(f_i)|_{dB}$ of the line. Specifically, errors of attenuations of the actual transfer function at the selected frequency points are calculated, and a line diameter Gx and a length Lx having the minimum error is determined as the actual line diameter and actual length of the line by traversing the line diameters Gx and the lengths Lx.

With reference to the loop length and line diameter calculated by directly means of a least square method, the equation for calculating mean-square errors is as follows:

$$\text{Error} = \sum_{i=1}^{N} (|H(Gx, Lx, f_i)|_{dB} - |H_{meas}(f_i)|_{dB})^2 \quad (29)$$

With the line diameter Gx and the length Lx being changed, the mean-square errors between the actual transfer function and the transfer function of the model without a position parameter of a bridge tap are compared, and a line diameter Gx and a length Lx corresponding to the minimum mean-square error is determined as the estimated line diameter and length of the line. In addition to the comparison of mean-square errors, absolute value errors, covariances, etc. can also be compared.

In Equation (6), Gx is a possible loop line diameter, Lx is a possible loop length under the line diameter Gx, $|H(Gx, Lx, f_i)|_{dB}$ is an attenuation at a frequency point fi under the line diameter Gx and the length Lx, $|H_{meas}(f)|_{dB}$ is an attenuation of the measured transfer function at the frequency point fi, and N is the number of the selected frequency points.

Rather than estimating the line diameters and lengths of the trunk line and the bridge tap by means of the method as described in steps 240 and 250, it is possible to obtain a transfer function of a line model (without a position parameter of a bridge tap) according to the transfer function of a bridge tap model and the transfer function of a trunk line model without a position parameter of a bridge tap, to compare the transfer function of the line model and the actual transfer function of the line by traversing respective parameters of the transfer function of the line model, and to take the parameters with which the error between the transfer function of the line model and the actual transfer function of the line is the minimum as the estimated line diameters and lengths of the trunk line and the bridge tap. Of course, with the method provided in steps 240 and 250, the calculation amount can be effectively reduced, in order to save the processing time and improve the efficiency.

Figure 3:
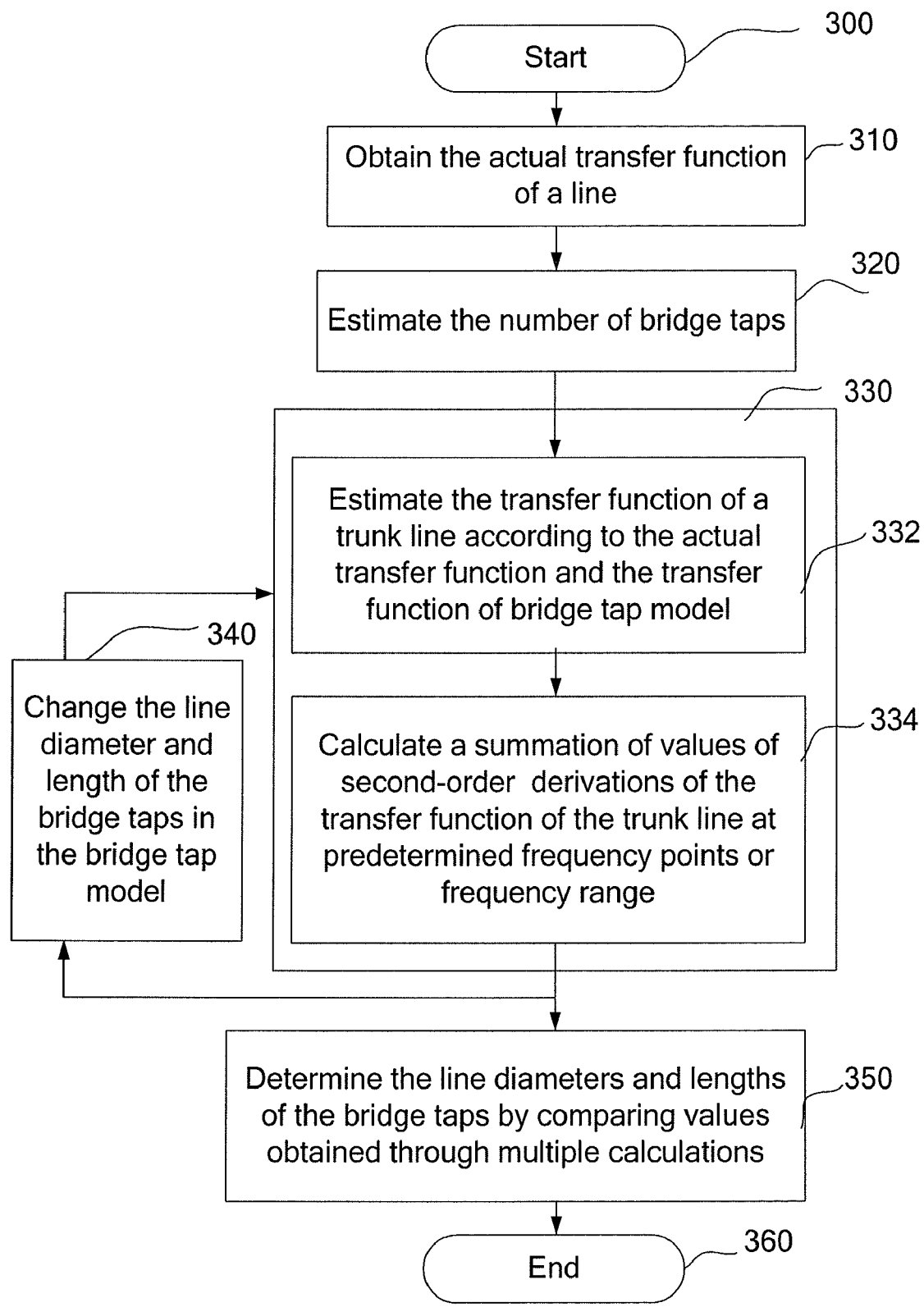
FIG. 3 is a flowchart illustrating a method for estimating a line diameter and length of a bridge tap according to an embodiment of the present disclosure.

Next, the method for estimating parameters of a bridge tap in step 240 is further described with reference to FIG. 3 in order to obtain the line diameter and length of the bridge tap. FIG. 3 illustrates a method for estimating parameters of the bridge tap according to an embodiment of the present disclosure. Step 240 in FIG. 2 is corresponding to steps 320 to 350 in FIG. 3.

The procedure in FIG. 3 starts at step 300, and ends at step 360.

In step 310, the actual transfer function of the line is obtained in the same way as in step 210 in FIG. 2, therefore the process is not described in detail here.

In step 320, the number of bridge taps is estimated. The number of the bridge taps can be estimated by traversing the bridge taps one by one or may be determined preferentially according to empirical values or actual network deployment. An example of two bridge taps is described as follows, which can be extended to apply to more bridge taps.

In step 330, line diameters and lengths of the bridge taps are selected and values of the second-order derivatives of the transfer function of the trunk line corresponding to the selected line diameters and lengths of the bridge taps are summed up. The details are described as follows.

In step 332, line diameters and lengths of the bridge taps are selected to obtain a transfer function of a bridge tap model corresponding thereto. A transfer function of the trunk line is obtained according to the actual transfer function obtained in step 310 and the transfer function of the bridge tap model.

Assuming that there are two bridge taps in the loop, then with reference to FIG. 1 the line topology may be as follows: the line diameters and the lengths of the trunk loop are (G1, L1), (G1, L2), (G1, L3), respectively; and the line diameters and the lengths of the bridge taps are (g1, d1), (g2, d2), respectively. The total length between two ends P0 and P1 of the line, i.e., the total length of the trunk, is L=L1+L2+L3.

$$H(f)=H(G1,L1,f)*H(g1,d1,f)*H(G1,L2,f)*H(g2,d2,f)*H(G1,L3,f) \quad (30)$$

The positions of the bridge taps have little influence on the transfer function. Thus the above equation may be approximated to:

$$H(f) \approx H(G1,L,f)*H(g1,d1,f)*H(g2,d2,f) \quad (31)$$

Thus, the transfer function of the trunk line is estimated as follows:

$$H_{trunk}(f) = \frac{H_{meas}(f)}{H(g1x, d1x, f)*H(g2x, d2x, f)} \quad (32)$$

In the above equation, $H_{meas}(f)$ is the measured actual transfer function, $H(g1x, d1x, f)$ and $H(g2x, d2x, f)$ and are the transfer functions of the selected bridge taps Tap1(g1x, d1x) and Tap2 (g2x, d2x), respectively.

In step 334, the line diameters and lengths of the bridge tap are calculated through a derivation method, as shown in Equation (33). Values (g1x, d1x) and (g2x, d2x) of the line diameters and lengths of the bridge taps are selected, and values of second-order derivatives of the transfer function of the trunk line without positional parameters of the bridge taps at the selected frequency points (or within the frequency range) are summed as follows:

$$sum = \sum_{f=f1}^{f2} \frac{\partial^2 \left( \left| \frac{H_{meas}(f)}{H(g1x, d1x, f)*H(g2x, d2x, f)} \right|_{dB} \right)}{\partial f^2} \quad (33)$$

$$= \sum_{f=f1}^{f2} \frac{\partial^2 (|H_{trunk}(f)|_{dB})}{\partial f^2}$$

In Equation (33), f1 is a start frequency point of the frequency range upon which the calculation is performed, and f2 is an end frequency point of the frequency range.

In step 340, the line diameters and lengths (g1x, d1x) and (g2x, d2x) of the bridge taps in the bridge tap model are changed, so that the process in step 330 is repeated.

In step 350, the results of several summations are compared, and the line diameters and lengths corresponding to the minimum value of the results of summations are determined as the estimated line diameters and lengths (g1, d1) and (g2, d2) of the bridge taps.

Figure 4:
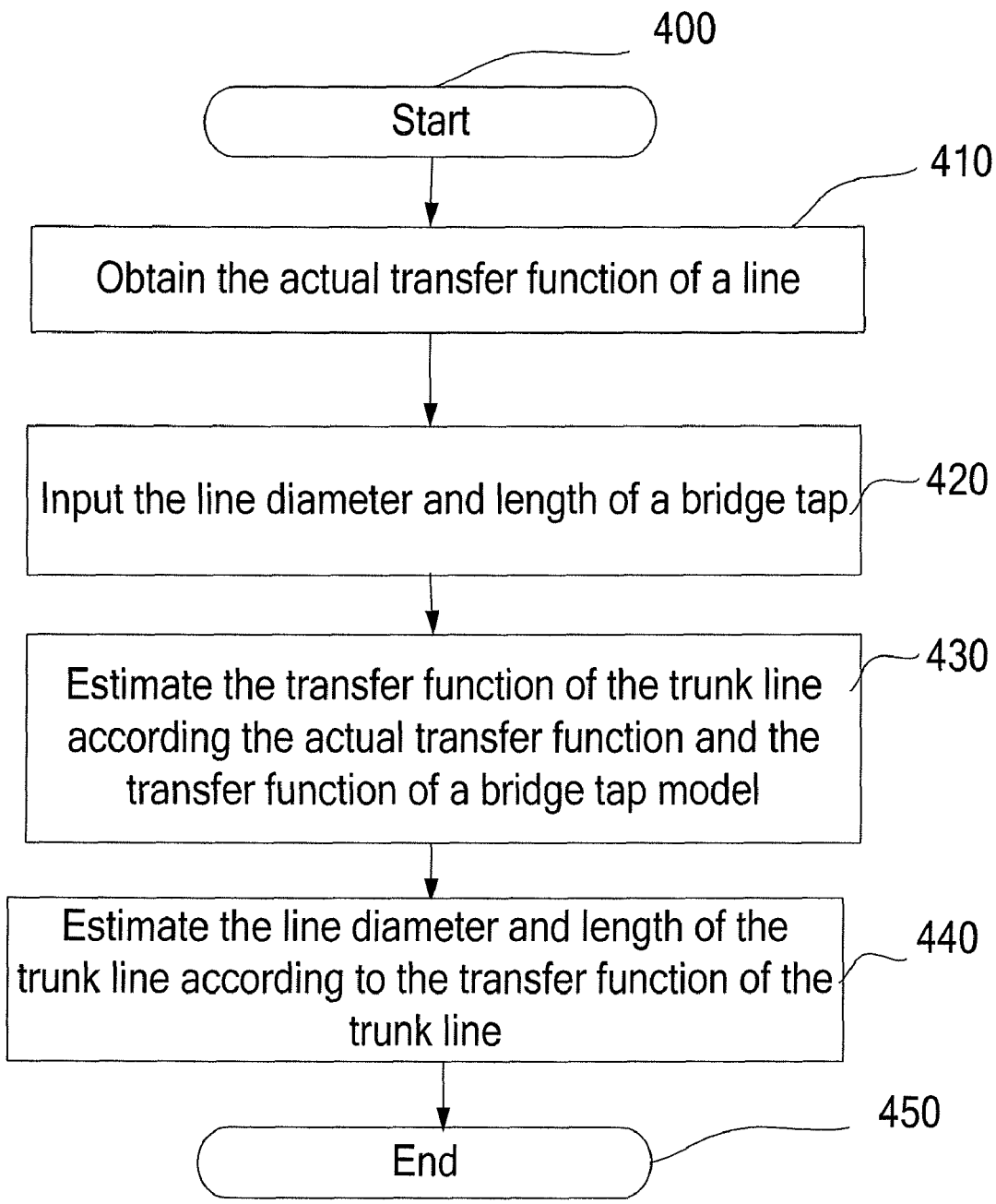
FIG. 4 is a flowchart illustrating a method for estimating a line diameter and length of a trunk line according to an embodiment of the present disclosure.

Next, the method for estimating parameters of the line in step 250 is further described with reference to FIG. 4 in order to estimate the line diameters and lengths of the bridge tap and the trunk line. FIG. 4 illustrates a method for estimating parameters of the line according to an embodiment of the present disclosure. Step 250 in FIG. 2 is corresponding to steps 420 to 440 in FIG. 4.

The procedure in FIG. 4 starts at step 400, and ends at step 450.

In step 410, the actual transfer function of the line is obtained in the same way as step 210 in FIG. 2 therefore the process is not described in detail here.

In step 420, line diameters and lengths of the bridge taps are input. In the embodiment of the present disclosure, the line diameters and lengths (g1, d1) and (g2, d2) of the bridge taps obtained in step 240 in FIG. 2 or step 350 in FIG. 3 can be used.

In step 430, the line diameters and lengths (g1, d1) and (g2, d2) of the bridge taps are substituted into Equation (32) to obtain the following equation:

$$H_{trunk}(f) = \frac{H_{meas}(f)}{H(g1, d1, f)*H(g2, d2, f)} \quad (34)$$

In Equation (34), $H_{meas}(f)$ is the measured actual transfer function, H(g1, d1, f) and H(g2, d2, f) are transfer functions of the inputted bridge taps Tap1(g1, d1) and Tap2(g2, d2), respectively.

In step 440, a line diameter and length of the trunk line are estimated without the influence from the bridge taps. According to the embodiment of the present disclosure, the line diameter and length of the trunk line are estimated in a similar way in step 230 where the line is regarded as having no bridge tap, wherein $$H_{trunk}(f) = \frac{H_{meas}(f)}{H(g1, d1, f)*H(g2, d2, f)}$$

obtained in step 430 is taken as the actual transfer function of the trunk line in step 230, so as to obtain the line diameter and length (G1, L) of the trunk line. The details are omitted herein.

Figure 5:
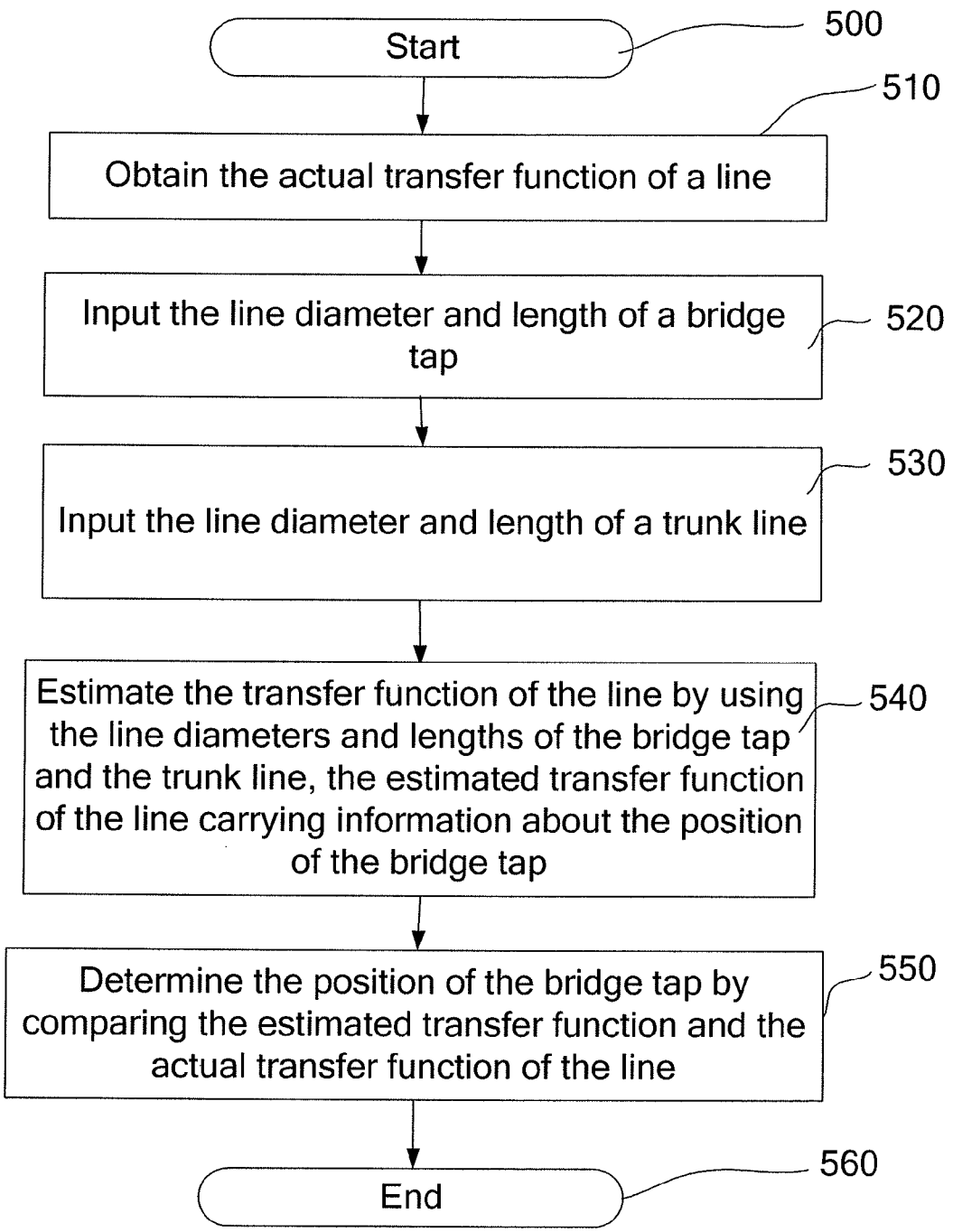
FIG. 5 is a flowchart illustrating a method for estimating a position of a bridge tap according to an embodiment of the present disclosure.

Next, the method for estimating parameters of the line topology in step 260 is further described with reference to FIG. 5. FIG. 5 illustrates a method for estimating parameters of the line topology according to an embodiment of the present disclosure. Step 260 in FIG. 2 is corresponding to steps 520 to 550 in FIG. 5.

The procedure in FIG. 5 starts at step 500, and ends at step 560.

In step 510, the actual transfer function of the line is obtained in the same way as step 210 in FIG. 2, and the description is omitted herein.

In step 520, line diameters and lengths of the bridge taps are input. In the embodiment of the present disclosure, the line diameters and lengths (g1, d1) and (g2, d2) of the bridge taps obtained in step 240 in FIG. 2 or step 350 in FIG. 3 can be used.

In step 530, a line diameter and length of the trunk line are input. In the embodiment of the present disclosure, the line diameter and length (G1, L) of the trunk line obtained in step 250 in FIG. 2 or step 440 in FIG. 4 can be used.

In step 540, a transfer function of the line model with the position parameters of the bridge taps is estimated according to the line diameters and lengths (g1, d1) and (g2, d2) of the bridge taps, as well as the line diameter and length (G1, L) of the trunk line. Herein, the transfer function H(f) of the line model with the position parameters of the bridge taps is shown as follows:

$$H(f)=H(G1,L1x,f)*H(g1,d1,f)*H(G1,L2x,f)*H(g2,d2,f)* H(G1,(L-L1x-L2x),f) \quad (12)$$

In Equation (12), H(g1, d1, f) H(g2, d2, f) and are transfer functions of the bridge taps Tap1 (g1, d1) and Tap2 (g2, d2), respectively, H(G1, L1x, f) H(G1, L2x, f) and H(G1,(L−L2x−L2x),f) are possible transfer functions of the respective segments of the trunk line, respectively. Herein, in view of the fact that two bridge taps are included in FIGS. 1, L1x and L2x represent the length from Tap1 to P0 and the length from Tap2 to Tap1, respectively.

By traversing the position parameters (e.g., L1x and L2x) of the bridge tap and comparing the mean-square errors between the transfer function of the line model with the position parameters of the bridge taps and the actual transfer function, it is determined the values of (L1x, L2x) corresponding to the minimum mean-square error as the estimated positions (L1, L2) of the bridge taps. The adopted mean-square error function is as follows:

$$\text{Error} = \sum_{i=1}^{N} (|H(f_i)|_{dB} - |H_{meas}(f_i)|_{dB})^2 \quad (35)$$

In case of traversing the position parameters L1x and L2x of the bridge taps, L2x and L2x corresponding to the minimum error are the required positions L1 and L2 of the bridge taps. With the solution of the present embodiment, the positions of the bridge taps can be determined just by traversing the positions of the bridge taps, and the calculation amount is small. In addition to the comparison of mean-square errors, absolute value errors, covariances, etc. can also be compared.

Figure 7:
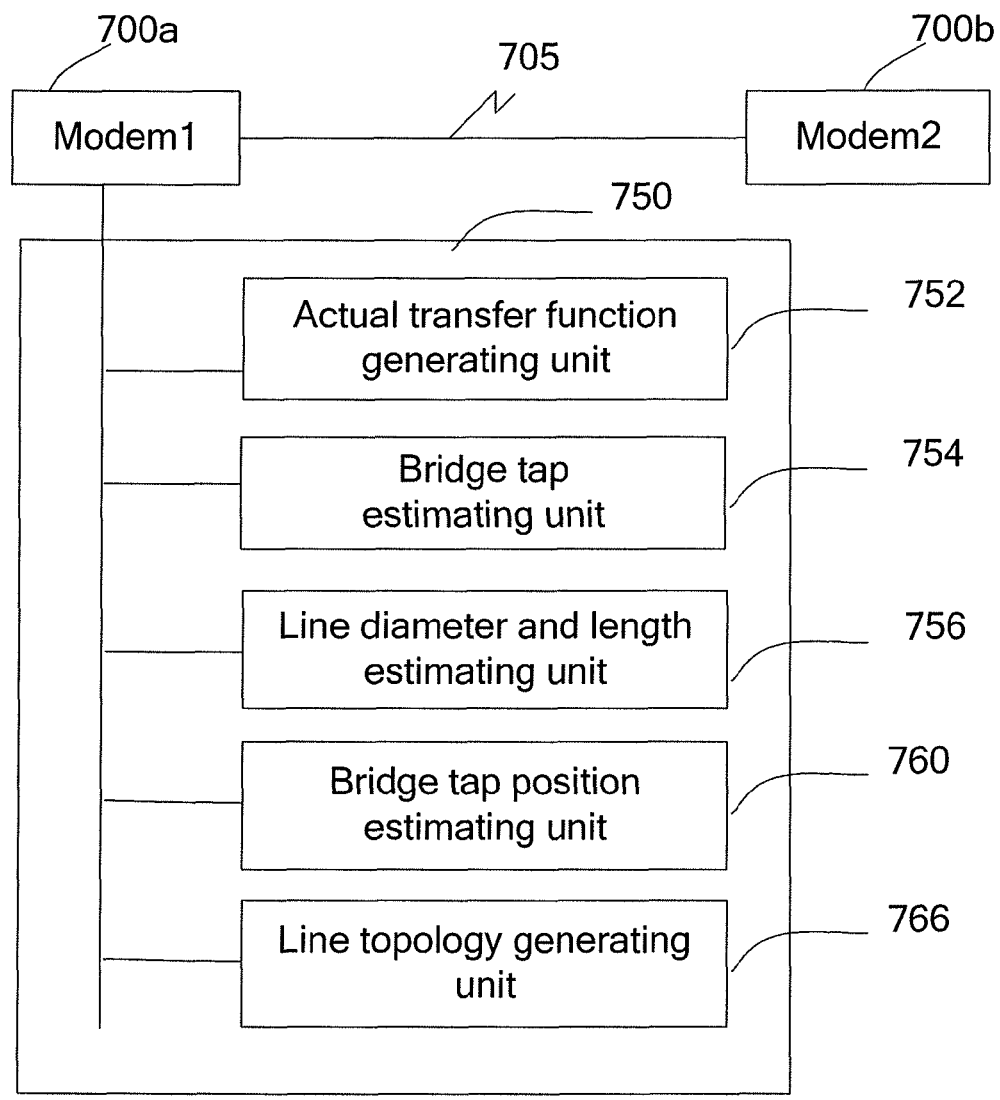
FIG. 7 is a block diagram of a line topology management system according to an embodiment of the present disclosure.

FIG. 7 is a block diagram illustrating a system for managing a line topology according to an embodiment of the present disclosure for implementing the above method.

FIG. 7 illustrates a system for performing line parameter estimation and topology estimation of a DSL 705 between DSL modems 700a and 700b. The estimation system may be arranged on a DSL transceiver such as a Control Office DSLAM and a CPE or may be arranged on a network management equipment or an upper operation and maintenance platform of the network management equipment.

In FIG. 7, the system for managing line topology includes some basic processing functional elements, storage functional elements, and interface elements to coordinate with the execution of computer programs in order to implement the functions of estimating line topological parameters and generating topology according to the embodiment of the present disclosure. The system for managing line topology according to the embodiment of the present disclosure includes an actual transfer function generating module 752, a bridge tap estimating module 754, a line diameter and length estimating module 756, a bridge tap position estimating module 760, and a line topology generating module 766.

The actual transfer function generating module 752 is configured to obtain an actual transfer function of the line. The actual transfer function generating module 752 may be coupled to a line test module (not shown in FIG. 7) to obtain the actual transfer function of the line according to a result of test by the line test module. In order to improve the precision of subsequent processing, the actual transfer function generating module 752 further includes one or more noise canceling modules (not shown in FIG. 7) configured to perform a noise canceling process of the actual transfer function of the line obtained through the test. The details of the noise canceling process are available from the description of step 210 in FIG. 2. In another embodiment of the present disclosure, the actual transfer function generating module 752 includes a line actual transfer function calculating module and one or more noise canceling modules. The line actual transfer function calculating module is configured to calculate an actual transfer function of a line according to a test result of each line test performed by the line test module and transmit the calculated actual transfer function to the one or more noise canceling modules. The one or more noise canceling modules are configured to perform a noise canceling process of the actual transfer function received from the line actual transfer function calculating module.

The bridge tap estimating module 754 is configured to calculate a summation of values of second-order derivatives of the actual transfer function within a spectral range, judge whether a bridge tap exists according to the result of the summation, and notify the line diameter and length estimating module 756 of the result of the judgment. When the bridge tap estimating module 754 judges that there is no bridge tap, the parameters of the trunk line can be calculated directly by skipping the step of estimating line parameters of a bridge tap, thereby accelerating line parameter calculation and saving calculation time.

The line diameter and length estimating module 756 is configured to estimate a line diameter and a length of the trunk line and a line diameter and a length of the bridge tap of the line. A transfer function of a line model without a position parameter of a bridge tap can be obtained according to the transfer function of a bridge tap model and the transfer function of a trunk line model, the transfer function of the line model without a position parameter of a bridge tap and the actual transfer function of the line are compared by traversing respective parameters of the transfer function of the line model without a position parameter of a bridge tap, and parameters in which the error between the transfer function of the line model without a position parameter of a bridge tap and the actual transfer function of the line is the minimum are determined as estimated line diameters and lengths of the trunk line and the bridge tap. In order to simplify the calculation process, the method as illustrated in FIG. 2 may also be adopted when there is no bridge tap in the line. The two ways in step 230 may be used to estimate the line diameter and length of the trunk line, and in this case, a parameter combination of the line diameter g and the length d of the bridge tap of the line can be represented as (0, 0). When a bridge tap exists, the ways in steps 240 and 250 may be used to calculate the line diameters and the lengths of the bridge tap and the trunk line.

The bridge tap position estimating module 760 is configured to obtain a transfer function of the line model with the position parameter of the bridge tap according to the estimated line diameters and the lengths of the bridge tap and the trunk line and estimate the position of the bridge tap by comparing the error between the actual transfer function and the transfer function of the line model with the position parameter of the bridge tap. Specifically, the bridge tap position estimating module 760 may estimate the transfer function of the line with information of the position parameter of the bridge tap according to the line diameters and the lengths of the bridge tap and the trunk line estimated by the line diameter and length estimating module 756, may calculate mean-square error between the transfer function of the line model with the position parameter of the bridge tap and the actual transfer function generated by the actual transfer function generating module 752, and may determine a position of the bridge tap corresponding to the minimum mean-square error as the estimated position of the bridge tap.

The line topology generating module 766 is configured to generate a line topology. Specifically, the line topology can be determined according to the parameters obtained by the line diameter and length estimating module 756 and the bridge tap position estimating module 760.

Figure 8:
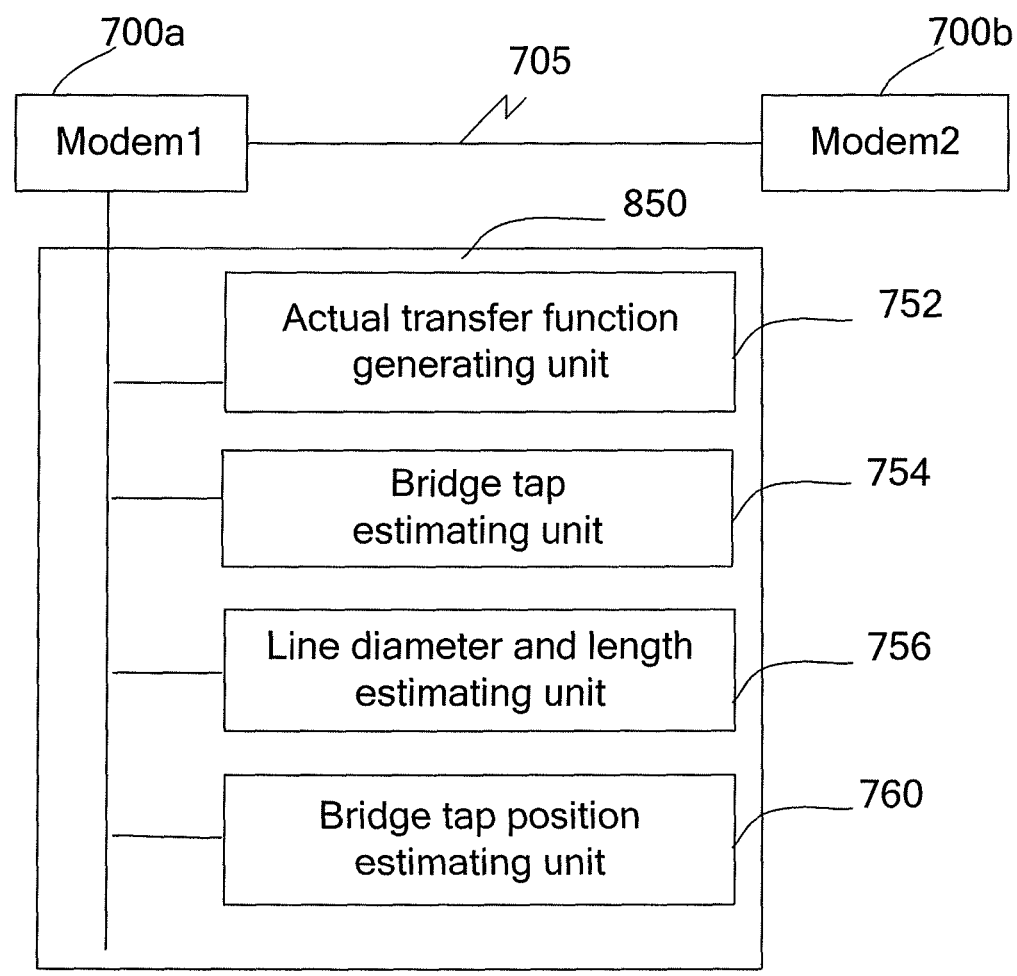
FIG. 8 is a block diagram of a line topological parameter estimating apparatus according to an embodiment of the present disclosure.

FIG. 8 illustrates a line topological parameter estimating apparatus 850 according to an embodiment of the present disclosure. The line topological parameter estimating apparatus 850 is configured to estimate line topological parameters, including line diameters and lengths of the trunk line and the bridge tap as well as the position of the bridge tap. If there is no bridge tap in the line, a parameter combination of the line diameter g and the length d of the bridge tap of the line can be represented as (0, 0). As illustrated in FIG. 8, the line topological parameter estimating apparatus 850 mainly includes an actual transfer function generating module 752, a line diameter and length estimating module 756, and a bridge tap position estimating module 760. The line topological parameter estimating apparatus 850 may further include a bridge tap estimating module 754. The functions of the above modules are the same as those of the modules having the identical reference numbers in FIG. 7, and therefore the description the above modules are omitted.

With the method and system for managing a line topology and the related apparatus according to the embodiments of the present disclosure it is possible to provide a Dynamic Line Management (DLM) system with information about network and line quality for performing quick diagnosis, analysis, and trouble shooting upon a network and to perform continuous and automatic monitoring of network service quality of the physical layer before number allocation or during the service, thereby improving the quality of service to end customers, increasing the customer's satisfaction and loyalty, and reducing the operation cost. In addition, with the method and system for managing a line topology and the related apparatus according to the embodiments of the present disclosure, line topological parameters can be obtained effectively, and the calculation amount is reduced, thereby saving the processing time and improving the efficiency.

Further, a person skilled in the art will appreciate that all or a part of the steps for implementing the methods of the above embodiments can be performed by a program stored in a computer readable storage medium instructing relevant hardware.

The method and system for managing a line topology and the related apparatus according to the embodiments of the present disclosure are described in details as above. To be noted, the embodiments of the present disclosure are just functionally described as above, and it is obvious for a person skilled in the art to design hardware and/or software embodiments of the present disclosure according to the above functional description. In addition, the principle and embodiments of the present disclosure are illustrated by way of concrete examples herein, and the description of the above embodiments just facilitates to understand the methods and key idea of the present disclosure. Meanwhile, a person skilled in the art can change the embodiments and application range according to the idea of the present disclosure. In summary, the content of the Description shall not be construed as limitations to the present disclosure.

What is claimed is:

1. A method for managing a line topology, comprising:
   obtaining an actual transfer function of a line by performing one or more line tests;
   estimating a line diameter and a length of a bridge tap of the line and a line diameter and a length of a trunk line of the line according to the actual transfer function of the line and a transfer function of a bridge tap model;
   obtaining a transfer function of a line model with a position parameter of the bridge tap according to the estimated line diameters and lengths of the bridge tap and the trunk line, respectively;
   estimating a position of the bridge tap by comparing an error between the actual transfer function and the transfer function of the line model with the position parameter of the bridge tap; and
   generating a topology of the line according to the estimated line diameters and lengths of the trunk line and the bridge tap and the position of the bridge tap;
   wherein before the estimating the line diameter and the length of the bridge tap according to the actual transfer function of the line and the transfer function of the bridge tap model, the method further comprising:
   performing a noise canceling process of the obtained actual transfer function of the line, wherein the noise canceling process comprising at least one of:
      performing an averaging process on the actual transfer function of the line obtained based on a plurality of tests to cancel noise;
      performing a median filtering process on the actual transfer function of the line within a filtering window to cancel noise; and
      performing a mean filtering process on the actual transfer function of the line within the filtering window to cancel noise.

2. The method according to claim 1, wherein after the obtaining the actual transfer function of the line, the method further comprising:
   summing up values of second-order derivatives of the actual transfer function within a spectral range and judging whether the bridge tap exists according to a result of the summation.

3. The method according to claim 2, wherein no bridge tap exists according to the result of the summation, the method further comprising at least one of:
   selecting the line diameter of the trunk line;
   estimating the length of the trunk line according to the selected line diameter of the trunk line, determining a transfer function of a trunk line model without the position parameter of the bridge tap according to the selected line diameter of the trunk line and the estimated length of the trunk line; and
estimating the line diameter and the length of the trunk line by comparing a mean-square error between the transfer function of the trunk line model without the position parameter of the bridge tap and the actual transfer function of the line; or
selecting the line diameter and the length of the trunk line; determining a transfer function of a trunk line model without the position parameter of the bridge tap according to the selected line diameter and the selected length of the trunk line, and
estimating the line diameter and the length of the trunk line by comparing the transfer function of the trunk line model without the position parameter of the bridge tap and the actual transfer function of the line.

4. The method according to claim 1, wherein the estimating the line diameters and the length of the bridge tap and the length of the trunk line of the line according to the actual transfer function of the line and the transfer function of the bridge tap model comprising:
estimating the line diameter and the length of the bridge tap according to the actual transfer function of the line and the transfer function of the bridge tap model;
obtaining the transfer function of the bridge tap according to the line diameter and the length of the bridge tap;
obtaining the actual transfer function of the trunk line according to the actual transfer function of the line and the transfer function of the bridge tap; and
estimating the line diameter and the length of the trunk line according to the actual transfer function of the trunk line.

5. The method according to claim 4, wherein the estimating the line diameter and the length of the bridge tap according to the actual transfer function of the line and the transfer function of the bridge tap model comprising:
selecting the line diameter and the length of the bridge tap;
estimating the transfer function of the trunk line according to the actual transfer function of the line and the selected line diameter and length of the bridge tap;
summing up values of second-order derivatives of the transfer function of the trunk line within a spectral range; and
determining the line diameter and the length of the bridge tap according to the result of the summation.

6. A method for estimating line parameters, comprising:
obtaining an actual transfer function of a line by performing one or more line tests;
estimating a line diameter and a length of a bridge tap of the line and a line diameter and a length of a trunk line of the line according to the actual transfer function of the line and a transfer function of a bridge tap model;
obtaining a transfer function of a line model with a position parameter of the bridge tap according to the estimated line diameters and lengths of the bridge tap and the trunk line, respectively;
estimating a position of the bridge tap by comparing an error between the actual transfer function and the transfer function of the line model with the position parameter of the bridge tap;
wherein after the obtaining the actual transfer function of the line, the method further comprising:
summing up values of second-order derivatives of the actual transfer function within a spectral range and judging whether the bridge tap exists according to a result of the summation.

7. The method according to claim 6, wherein no bridge tap exists according to the result of the summation, the method further comprising one of:
selecting the line diameter of the trunk line;
estimating the length of the trunk line according to the selected line diameter of the trunk line,
determining a transfer function of a trunk line model without the position parameter of the bridge tap according to the selected line diameter of the trunk line and the estimated length of the trunk line; and
estimating the line diameter and the length of the trunk line by comparing a mean-square error between the transfer function of the trunk line model without the position parameter of the bridge tap and the actual transfer function of the line; or
selecting the line diameter and the length of the trunk line; determining a transfer function of a trunk line model without the position parameter of the bridge tap according to the selected line diameter and the selected length of the trunk line, and
estimating the line diameter and the length of the trunk line by comparing the transfer function of the trunk line model without the position parameter of the bridge tap and the actual transfer function of the line.

8. The method according to claim 6, wherein the estimating the line diameters and the length of the bridge tap and the length of the trunk line of the line according to the actual transfer function of the line and the transfer function of the bridge tap model comprising:
estimating the line diameter and the length of the bridge tap according to the actual transfer function of the line and the transfer function of the bridge tap model;
obtaining the transfer function of the bridge tap according to the line diameter and the length of the bridge tap;
obtaining the actual transfer function of the trunk line according to the actual transfer function of the line and the transfer function of the bridge tap; and
estimating the line diameter and the length of the trunk line according to the actual transfer function of the trunk line.

9. The method according to claim 8, wherein the estimating the line diameter and the length of the bridge tap according to the actual transfer function of the line and the transfer function of the bridge tap model comprising:
selecting the line diameter and the length of the bridge tap;
estimating the transfer function of the trunk line according to the actual transfer function of the line and the selected line diameter and length of the bridge tap;
summing up values of second-order derivatives of the transfer function of the trunk line within a spectral range; and
determining the line diameter and the length of the bridge tap according to the result of the summation.

10. A system for managing a line topology, comprising:
an actual transfer function generating module configured to obtain an actual transfer function of a line according to test results of one or more line tests;
a line diameter and length estimating module configured to estimate a respective line diameter and a respective length of a bridge tap and a trunk line of the line according to the actual transfer function and a transfer function of a bridge tap model;
a bridge tap position estimating module configured to obtain a transfer function of a line model with a position parameter of the bridge tap according to the estimated line diameters and lengths of the bridge tap and the trunk line and to estimate a position of the bridge tap based on a comparison of an error between the actual transfer function and the transfer function of the line model with the position parameter of the bridge tap; and a line topology generating module configured to generate a line topology according to the estimated line diameters and lengths of the trunk line and the bridge tap and the estimated position of the bridge tap;

a bridge tap estimating module configured to sum values of second-order derivatives of the actual transfer function within a spectral range, judge whether a bridge tap exists according a result of the summation, and notify the line diameter and length estimating module of the result of the judgment.

11. The system according to claim 10, wherein the actual transfer function generating module comprises a line actual transfer function calculating module and one or more noise canceling modules, wherein the line actual transfer function calculating module is configured to calculate an actual transfer function of the line according to a test result of each line test performed by the line test module and to transmit the calculated actual transfer function to the one or more noise canceling modules and wherein the one or more noise canceling modules are configured to perform a noise canceling process of the actual transfer function received from the line actual transfer function calculating module.

12. A computer readable storage medium for storing a program instructing a hardware to implement the following steps:

obtaining an actual transfer function of a line according to test results of one or more line tests;

summing values of second-order derivatives of the actual transfer function within a spectral range, judge whether a bridge tap exists according a result of the summation;

estimating a line diameter and a length of a bridge tap of the line and a line diameter and a length of a trunk line of the line according to the actual transfer function of the line and a transfer function of a bridge tap model;

obtaining a transfer function of a line model with a position parameter of the bridge tap according to the estimated line diameters and lengths of the bridge tap and the trunk line, respectively;

estimating a position of the bridge tap by comparing an error between the actual transfer function and the transfer function of the line model with the position parameter of the bridge tap.

13. The computer readable storage medium according to claim 12, wherein the estimating the line diameters and the length of the bridge tap and the length of the trunk line of the line according to the actual transfer function of the line and the transfer function of the bridge tap model comprising:

estimating the line diameter and the length of the bridge tap according to the actual transfer function of the line and the transfer function of the bridge tap model;

obtaining the transfer function of the bridge tap according to the line diameter and the length of the bridge tap;

obtaining the actual transfer function of the trunk line according to the actual transfer function of the line and the transfer function of the bridge tap; and estimating the line diameter and the length of the trunk line according to the actual transfer function of the trunk line.

14. The computer readable storage medium according to claim 13, wherein the estimating the line diameter and the length of the bridge tap according to the actual transfer function of the line and the transfer function of the bridge tap model comprising:

selecting the line diameter and the length of the bridge tap;

estimating the transfer function of the trunk line according to the actual transfer function of the line and the selected line diameter and length of the bridge tap;

summing up values of second-order derivatives of the transfer function of the trunk line within a spectral range; and determining the line diameter and the length of the bridge tap according to the result of the summation.

* * * * *